US011947404B2

(12) United States Patent
Qin et al.

(10) Patent No.: US 11,947,404 B2
(45) Date of Patent: Apr. 2, 2024

(54) ELECTRONIC DEVICE CONTROL METHOD AND DEVICE

(71) Applicant: Lenovo (Beijing) Limited, Beijing (CN)

(72) Inventors: Zhen Qin, Beijing (CN); Qihua Xiao, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 191 days.

(21) Appl. No.: 17/551,869

(22) Filed: Dec. 15, 2021

(65) Prior Publication Data
US 2022/0308651 A1    Sep. 29, 2022

(30) Foreign Application Priority Data
Mar. 29, 2021 (CN) .......................... 202110344747.9

(51) Int. Cl.
*G06F 1/3234* (2019.01)
*G06T 7/20* (2017.01)
*G06T 7/50* (2017.01)
*G06T 7/70* (2017.01)

(52) U.S. Cl.
CPC .............. *G06F 1/3234* (2013.01); *G06T 7/20* (2013.01); *G06T 7/50* (2017.01); *G06T 7/70* (2017.01); *G06T 2207/30196* (2013.01)

(58) Field of Classification Search
CPC . G06F 1/3234; G06T 7/50; G06T 7/70; G06T 7/20
USPC ........................................................ 713/323
See application file for complete search history.

(56) References Cited

U.S. PATENT DOCUMENTS

| 3,675,195 A | * | 7/1972 | Iwamoto | G01V 3/102 340/941 |
| 4,820,037 A | * | 4/1989 | Kohayakawa | A61B 3/103 351/211 |
| 5,017,788 A | * | 5/1991 | Humphrey | G01T 1/167 250/336.1 |
| 5,374,932 A | * | 12/1994 | Wyschogrod | G01S 13/91 342/39 |
| 5,502,482 A | * | 3/1996 | Graham | H04N 19/54 348/700 |
| 5,682,331 A | * | 10/1997 | Berlin | B65H 23/046 219/121.79 |
| 5,871,062 A | * | 2/1999 | Desens | B60W 30/16 180/169 |

(Continued)

FOREIGN PATENT DOCUMENTS

| CN | 109739339 A | 5/2019 |
| CN | 111221415 A | 6/2020 |

*Primary Examiner* — Paul R. Myers
(74) *Attorney, Agent, or Firm* — ANOVA LAW GROUP, PLLC

(57) ABSTRACT

An electronic device control method includes obtaining position information of a specific object in a detection area, determining a movement direction of the specific object based on the position information, setting the electronic device to a first operating state in response to the specific object moving out of the detection area from a first direction, or setting the electronic device to a second operating state in response to the specific object moving out of the detection area from a second direction, the first operating state being different from the second operating state when the first direction is different form the second direction.

20 Claims, 4 Drawing Sheets

(56) References Cited

U.S. PATENT DOCUMENTS

| | | | | |
|---|---|---|---|---|
| 6,427,913 B1* | 8/2002 | Maloney | G08B 13/2477 | 235/383 |
| 6,754,368 B1* | 6/2004 | Cohen | G01S 13/66 | 382/103 |
| 7,100,052 B2* | 8/2006 | Ghazarian | G01S 17/74 | 713/185 |
| 10,992,903 B1* | 4/2021 | Yang | H04N 7/15 | |
| 2007/0182818 A1* | 8/2007 | Buehler | G08B 13/19641 | 348/143 |
| 2007/0265082 A1* | 11/2007 | Shimura | A63F 13/10 | 463/37 |
| 2010/0201837 A1* | 8/2010 | Won | H04N 23/64 | 348/222.1 |
| 2011/0304591 A1* | 12/2011 | Takahashi | G06F 3/0428 | 250/221 |
| 2012/0019149 A1* | 1/2012 | Shih | H05B 47/115 | 315/149 |
| 2014/0015930 A1* | 1/2014 | Sengupta | G06F 21/32 | 348/46 |
| 2015/0009332 A1* | 1/2015 | Fuhrmann | G07C 9/00 | 348/155 |
| 2015/0054856 A1* | 2/2015 | Sawai | G06F 3/0304 | 345/681 |
| 2015/0312445 A1* | 10/2015 | Cha | H04N 23/62 | 348/48 |
| 2015/0381940 A1* | 12/2015 | Hari | H04L 67/52 | 348/159 |
| 2016/0282875 A1* | 9/2016 | Nagamine | G06T 7/73 | |
| 2018/0292906 A1* | 10/2018 | Kato | H04N 5/74 | |
| 2019/0135316 A1* | 5/2019 | Hilleary | G01S 13/62 | |
| 2019/0206065 A1* | 7/2019 | Ju | G06T 7/74 | |
| 2020/0241549 A1* | 7/2020 | Tsurumi | G05D 1/0246 | |
| 2020/0349719 A1* | 11/2020 | Yachida | G06T 7/248 | |
| 2021/0342619 A1* | 11/2021 | Faller | G06T 7/292 | |
| 2022/0245837 A1* | 8/2022 | Weng | G06T 7/292 | |

* cited by examiner

ELECTRONIC DEVICE CONTROL METHOD AND DEVICE

CROSS-REFERENCES TO RELATED APPLICATION

This application claims priority to Chinese Patent Application No. 202110344747.9, filed on Mar. 29, 2021, the entire content of which is incorporated herein by reference.

FIELD OF TECHNOLOGY

The present disclosure relates to the fields of control of electronic devices and, more specifically, to an electronic device control method and device.

BACKGROUND

In many electronic devices, a detection device is installed on the electronic device to detect the state of users or objects, but the movement of users or objects, or the position or attitude of the electronic device can lead to control that does not conform to the user's intention. For example, a time-of-flight (TOF) sensor is used on a laptop computer to detect users and objects, thereby realizing automatic wake-up, appearance, unlock, video pause and other functions. However, the range of the field of view (FOV) of the TOF sensor cannot fully meet the needs of the user. The working principle of the TOF sensor here is to detect users/objects within the field of view, which will cause some false detections, such as no detection after the user leaves the field of view of the TOF sensor, but does not actually leave the laptop computer. For example, some users tend to have a larger opening and closing angle of the laptop computer, such that the field of view of the TOF sensor will be on top of the user's head without detecting the user's presence, but the user is actually in front of the laptop computer at this time. In another example, when the user is relaxing, such as watching a movie, as shown in FIG. 1, the user may lie back on a chair or move the body position downwards. In these cases, the field of view of the TOF sensor will also be on top of the user's head without detecting the user's presence. The two examples provided above are the common situations in testing and actual use scenarios.

BRIEF SUMMARY OF THE DISCLOSURE

One aspect of the present disclosure provides an electronic device control method. The method includes obtaining position information of a specific object in a detection area, determining a movement direction of the specific object based on the position information, setting the electronic device to a first operating state in response to the specific object moving out of the detection area from a first direction, or setting the electronic device to a second operating state in response to the specific object moving out of the detection area from a second direction. When the first direction and the second direction are different, and the first operating state and the second operating state are different.

Another aspect of the present disclosure provides an electronic device control device. The device includes an acquisition circuit configured to obtain position information of a specific object in a detection area, a determination circuit configured to determine a movement direction of the specific object based on the position information, and a setting circuit configured to set the electronic device to a first operating state in response to the specific object moving out of the detection area from a first direction, or, set the electronic device to a second operating state in response to the specific object moving out of the detection area from a second direction. When the first direction and the second direction are different, the first operating state and the second operating state are different.

Another aspect of the present disclosure provides an electronic device. The electronic device includes a processor and a memory. The memory stores program instructions that, when being executed by the processor, cause the processor to obtain position information of a specific object in a detection area, determine a movement direction of the specific object based on the position information, and set the electronic device to a first operating state in response to the specific object moving out of the detection area from a first direction, or, set the electronic device to a second operating state in response to the specific object moving out of the detection area from a second direction. When the first direction and the second direction are different, the first operating state and the second operating state are different.

BRIEF DESCRIPTION OF THE DRAWINGS

To more clearly illustrate the technical solution in the present disclosure, the accompanying drawings used in the description of the disclosed embodiments are briefly described hereinafter. The drawings are not necessarily drawn to scale. Similar drawing labels in different drawings refer to similar components. Similar drawing labels with different letter suffixes refer to different examples of similar components. The drawings described below are merely some embodiments of the present disclosure. Other drawings may be derived from such drawings by a person with ordinary skill in the art without creative efforts and may be encompassed in the present disclosure.

DETAILED DESCRIPTION

Reference will now be made in detail to various embodiments of the present disclosure, which are illustrated in the accompanying drawings. Wherever possible, the same reference numbers will be used throughout the drawings to refer to the same or the alike parts. The described embodiments are some but not all of the embodiments of the present disclosure. Based on the disclosed embodiments, persons of ordinary skill in the art may derive other embodiments consistent with the present disclosure, all of which are within the scope of the present disclosure.

It should be appreciated that the disclosed embodiments are only examples of the present disclosure, which may be implemented in various ways. Well-known and/or repeated functions and structures are not described in detail to avoid unnecessary or redundant details that may obscure the present disclosure. Therefore, the specific structural and functional details disclosed herein are not intended to limit the present disclosure, but are only used as a basis of claims and representative basis to teach those skilled in the art to use the present disclosure in a variety of ways and in substantially any suitable detailed structure.

The disclosed embodiments in the present disclosure are merely examples for illustrating the general principles of the invention. Any equivalent or modification thereof, without departing from the spirit and principle of the present invention, falls within the true scope of the present invention.

The phrase "in one embodiment", "in another embodiment", "in still another embodiment" or "in other embodiments" may be used in the description, which may refer to one or more of the same or different embodiments according to the present disclosure.

An embodiment of the present disclosure provides a control method of an electronic device. The electronic device may be any electronic device that can realize interactive functions with the user, which not only include laptop computers, desktop computers, and tablet computers, but also include mobile communication devices, such as mobile phones. Of course, the electronic device may also be other devices that can interact with the user, such as e-books, learning machines, etc.

Figure 1:
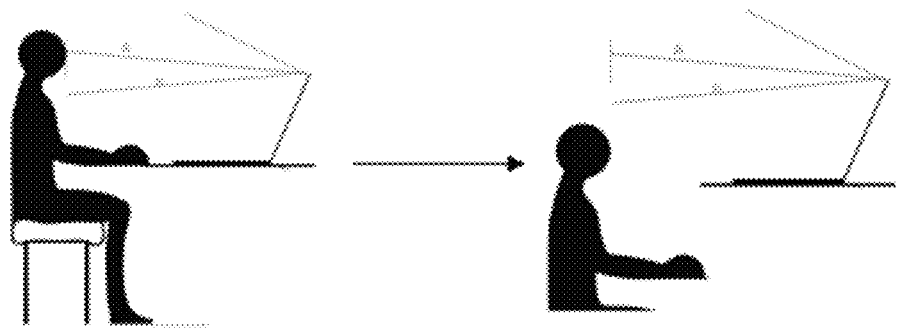
FIG. 1 is a schematic diagram of an electronic device according to an embodiment of the present disclosure.
Figure 2:
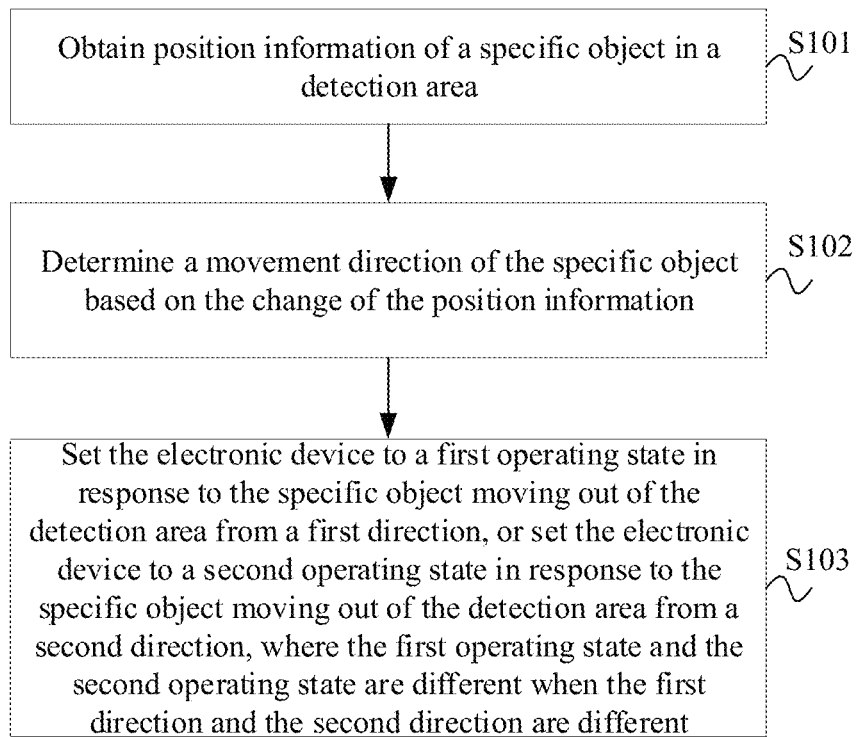
FIG. 2 is a flowchart of an electronic device control method according to an embodiment of the present disclosure.

The control method of the electronic device provided by the embodiments of the present disclosure can cause the electronic device to perform different controls based on the obtained movement of a specific object. FIG. 2 is a flowchart of an electronic device control method according to an embodiment of the present disclosure. The method will be described in detail below.

S101, obtaining position information of a specific object in a detection area.

When a specific object such as a user is operating the electronic device, the user may need to be positioned in front of the electronic device in order to interact with the electronic device. In some embodiments, the electronic device may include a detection device to detect the current state of the user. Therefore, the user needs to be positioned in a detection area of the detection device during the operation of the electronic device, such that the electronic device can obtain the user's operating state. In some embodiments, the detection area may have a certain detection range, which can also be understood as a field of view. When the detection device adopts a TOF sensor, the detection range may correspond to the angle of field of view of the TOF sensor. The TOF sensor can measure the time required for an object to travel through a medium, that is, the time is generally a measure of time elapsed between the time when the TOF sensor emits a wave pulse and the time when the wave pulse reflected by the object returns to the TOF sensor. In some embodiments, the position information of a specific object in the detection area may be obtained first, such that the state of the specific object can be obtained by analyzing the position information of the specific object.

Figure 3:
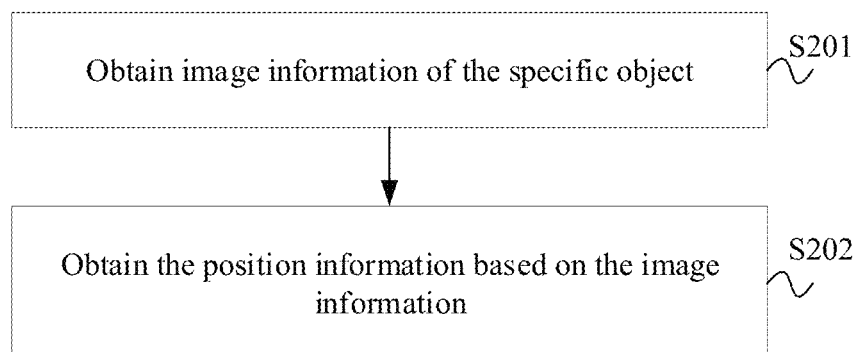
FIG. 3 is a flowchart of the electronic device control method according to an embodiment of the present disclosure.

Further, the position information of the specific object positioned in the detection area of the detection device may be obtained by using various methods. As shown in FIG. 3, the position information may be obtained through the following processes.

S201, obtaining image information of the specific object.

In some embodiments, the image information of the specific object may be obtained first. Since the specific object operates the electronic device in front of the electronic device, the image information of the specific object may be obtained through a camera arranged on the electronic device. The image information may include information such as the outline and movement of the specific object. Of course, the obtained image information may be two-dimensional or three-dimensional image data or continuous video data. If the obtained image information is video data, the image data of each frame of the image in the video data may be further obtained by analyzing the video data.

S202, obtaining the position information based on the image information.

After obtaining the image information of the specific object, the position information of the specific object may be obtained based on the image information. More specifically, based on the image information, feature data such as the size and resolution of the image information, the proportion and position of the specific object in the image information may be further extracted, thereby obtaining the position information of the specific object. The position information may be the position coordinates of the whole or different parts of the specific object in a pre-defined coordinate system, or it may be the relative position relationship between the specific object and the electronic device in the pre-defined coordinate system. For example, the pre-defined coordinate system may be established based on the basic position of the position information.

Figure 4:
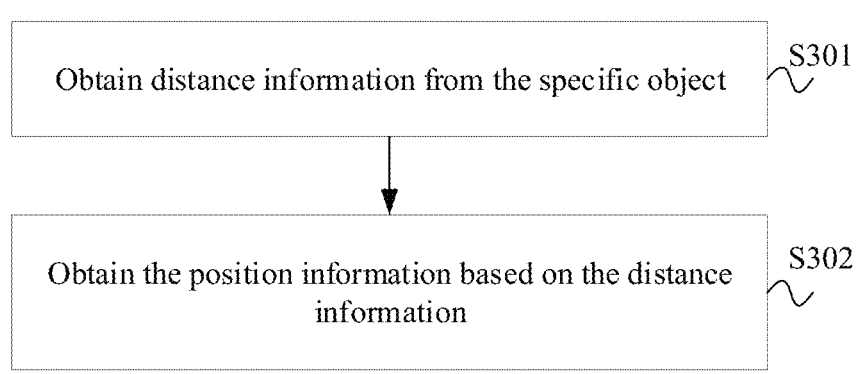
FIG. 4 is a flowchart of the electronic device control method according to an embodiment of the present disclosure.

Of course, the position information of a specific object in the detection area may also be obtained by using other methods. As shown in FIG. 4, the position information may be obtained through the following processes.

S301, obtaining distance information from the specific object.

As described above, the detection device may be arranged in the electronic device to detect the current state of the user. In some embodiments, the distance information between the detection device and the specific object may be obtained. The detection device may be a distance sensor, and the specific types of distance sensor is not limited in the embodiments of the present disclosure. For example, the distance sensor may be a laser distance measuring sensor, an infrared distance measuring sensor, etc. In some embodiments, the detection device may be arranged above a screen of the electronic device.

Figure 5:
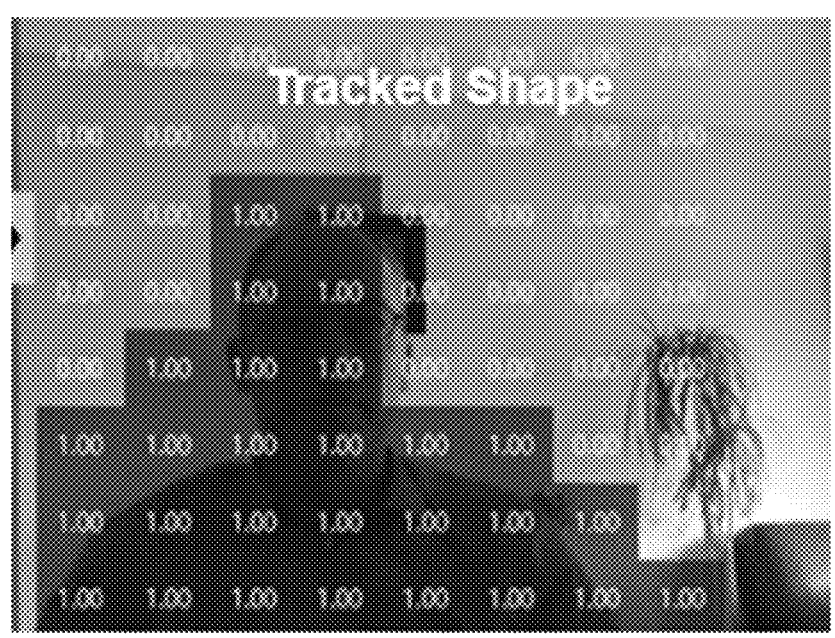
FIG. 5 is a schematic diagram in which regions are arranged in a matrix in the electronic device control method according to an embodiment of the present disclosure.

Further, since the specific object, such as the user, may have a relatively large size relative to the electronic device, in order to obtain the current state of the specific object more accurately, obtaining the distance information from the specific object may include obtaining the distance information between each area in a sensing surface of the detection device and the specific object. In some embodiments, the sensing surface may include a plurality of regions. For example, the detection device may be a TOF sensor. The sensing surface of the TOF sensor may include a plurality of regions, and the distance information between each region in the sensing surface of the TOF sensor and the specific object may be obtained. Further, as shown in FIG. 5, the plurality of regions in the sensing surface can be arranged in any manner. For example, the plurality of regions may be arranged in a matrix. The plurality of regions arranged in a matrix may achieve mutual correspondence with the specific object, such that the distance information from the specific object can be obtained more accurately.

S302, obtaining the position information based on the distance information.

After obtaining the distance between the specific object, the position information of the specific object may be obtained based on the distance information. More specifically, the position of the electronic device may be used as the basis, and the position information of the specific object may be obtained based on the position of the electronic device. The position information may be the position coordinates of the specific object in a pre-defined coordinate system, and the coordinate system may be established based on the position of the electronic device. In addition, when the TOF sensor is used, in addition to obtaining the position information of the specific object, information such as the types of the specific object and the outline of the specific object may also be obtained. In some embodiments, the outline of the specific object may be obtained based on the distance information between region of the regions and the specific object.

S102, determining a movement direction of the specific object based on a change of the position information.

After obtaining the position information of the specific object in the detection area, the movement direction of the specific object may be determined based on the change of the position information. The change of position information may refer to the change of parameters such as the position coordinates of the specific object, the relative position relationship of the specific object with respect to the position information, etc., based on which the direction of movement of the specific object may be determined. For example, an increase in the value of the horizontal coordinate in the position coordinates of the specific object may indicate that the specific object is moving toward the upper side of the electronic device. When the detection device is a TOF sensor, the change in the position information may be obtained based on the obtained change in the distance information between reach of the regions and the specific object.

S103, setting the electronic device to a first operating state in response to the specific object moving out of the detection area from a first direction, or, setting the electronic device to a second operating state in response to the specific object moving out of the detection area from a second direction, where the first operating state and the second operating state are different when the first direction and the second direction are different.

After determining the movement direction of the specific object, based on the change of position information of the specific object, the intention of the specific object may be further determined based on different movement direction of the specific object, such as when the user leaves the electronic device, when the user adjust the attitude but continue to operate the electronic device, etc., thereby controlling the electronic device to be set to different states based on different intentions.

In this process, the electronic device may be set to a first operating state in response to the specific object moving out of the detection area from a first direction, or the electronic device may be set to a second operating state in response to the specific object moving out of the detection area from a second direction. In some embodiments, when the first direction and the second direction are different, the first operating state and the second operating state may be different. In this way, the electronic device can be further controlled to be set to different states based on the different movement directions of the specific object.

Figure 6:
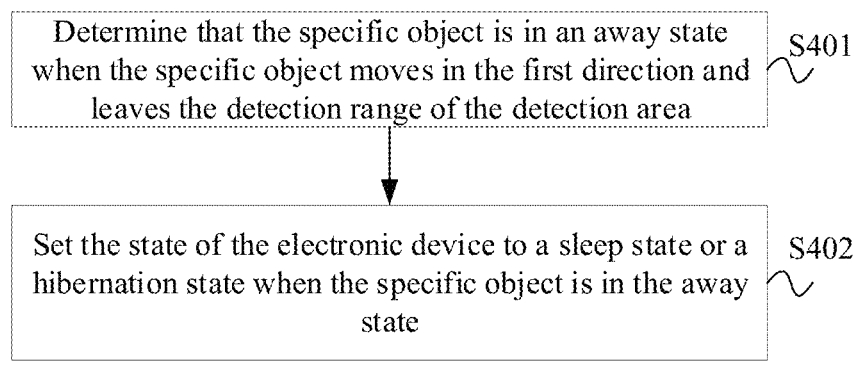
FIG. 6 is a flowchart of the electronic device control method according to an embodiment of the present disclosure.

In some embodiments, as shown in FIG. 6, setting the electronic device to the first operating state in response to the specific object moving out of the detection area from the first direction may include the following processes.

S401, determining that the specific object is in an away state when the specific object moves in the first direction and leaves the detection range of the detection area.

Figure 8:
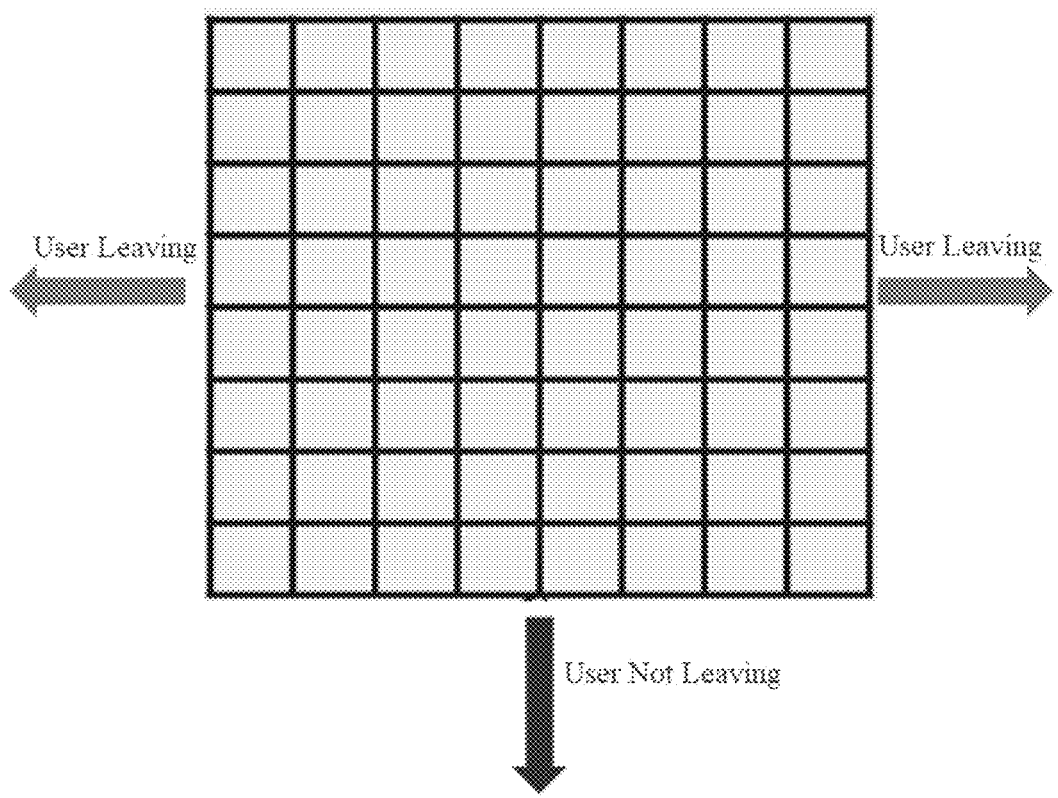
FIG. 8 is a schematic diagram of a movement of a specific object in the electronic device control method according to an embodiment of the present disclosure.

When it is determined that the specific object moves in the first direction and leaves the detection range of the detection area, the specific object may be determined as leaving the electronic device. As shown in FIG. 8, for example, the user is sitting and operating the laptop computer, and the user stands up such that the user moves to either the left or the right side relative to the laptop computer and moves out of the detection range of the detection area. At this time, the user's intention can be determined as no longer operating the laptop computer, therefore, the specific object can be determined to be in the away state. The first direction may be any direction of movement that can indicate that the specific object has an intention to stop using the specific object. For example, the first direction may be a direction toward either left or right side of the electronic device.

S402, setting the state of the electronic device to a sleep state or a hibernation state when the specific object is in the away state.

When it is determined that the specific object is in the away state, that is, for example, when the user's intention is to no longer use the laptop computer, for the sake of saving resources, the state of the electronic device can be set to the sleep state or the hibernation state. That is, when it is determined that the intention of the specific object is to leave the electronic device, the electronic device may be set to be in a temporarily non-operational state, that is, the sleep state or the hibernation state, to save resources. The sleep state may be a state in which the electronic device no longer executes other programs in additional to ensuring basic function. The hibernation state may be a state in which the only the display function is longer executed. The specific conditions of the sleep state or the hibernation state can be set based on actual needs.

Further, when the electronic device is in the sleep state or the hibernation state, the display device of the electronic device may be controlled to be in an off state or a locked state. In order to save the display power consumption of the display device of the electronic device, for example, when the state of the electronic device is in a sleep state or a hibernation state, the display device may be controlled to be turned off. Of course, the display device may also be controlled to be in a locked state.

Figure 7:
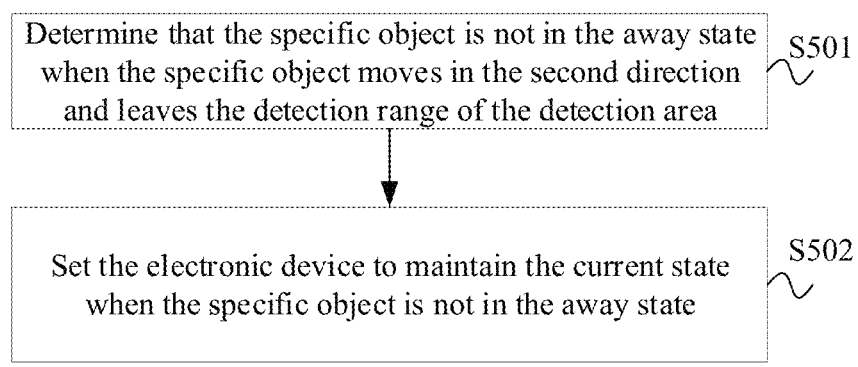
FIG. 7 is a flowchart of the electronic device control method according to an embodiment of the present disclosure.

In some embodiments, as shown in FIG. 7, setting the electronic device to the second operating state in response to the specific object moving out of the detection area from the second direction may include the following processes.

S501, determining that the specific object is not in the away state when the specific object moves in the second direction and leaves the detection range of the detection area.

When it is determined that the specific object moves in the second direction and leaves the detection range of the detection area, the specific object may be determined as not leaving the electronic device. As shown in FIG. 8, for example, the user is sitting and operating the laptop computer and, the user stands up and moves his body upward relative to the laptop computer and moves out of the detection range of the detection area, or the user feels that the angle of the display of the laptop computer is not appropriate and adjusts its inclination angle or the user lies back such that the user moves downward relative to the laptop computer, and moves out of the detection range of the detection area. At this time, the user's intention can be determined as to only adjusting the user's attitude and still wanting to continue to operate the laptop computer. As such, the specific object can be determined as not leaving, that is, the specific object is not in the away state. The second direction may arbitrarily indicate the movement direction of the specific object with the intention of continuing to use the electronic device. For example, the second direction may be a direction toward the upper side or the lower side of the electronic device.

S502, setting the electronic device to maintain the current state when the specific object is not in the away state.

After determining that the specific object is not in the away state, that is, for example, the user's intention is to continue using the laptop computer, the electronic device may be set to maintain the current state. That is, when it is determined that the intention of the specific object is to continue to user the electronic device, the state of the electronic device can remain unchanged.

Further, when the electronic device maintains the current state, the detection range of the detection area may be adjusted based on the position information. Due to the position change of the specific object or the attitude adjustment of the electronic device, the specific object may move upward or downward relative to the electronic device and moves out of the detection range of the detection area. In order to ensure that the user can continue to use the electronic device, the detection range of the detection area may be adjusted. For example, the position and angle of the detection device on the electronic device may be adjusted. When the detection device is a TOF sensor, the angle of the field of view of the TOF sensor may be adjusted.

In addition, considering that based on the different types of the electronic devices, the user may operate the electronic devices in any attitude. For example, the user may sit to operate a laptop computer, or operate a tablet computer at an angle, etc. That is, the attitude of the electronic device in use by the user may not be accurately determined. Therefore, in order to accurately determine the movement direction of the specific object, the first direction or the second direction may be determined based on the current attitude of the electronic device. That is, the first direction and the second direction may be adjusted based on changes in the current attitude of the electronic device.

Consistent with the present disclosure, the use's state and true intention can be accurately determined based on the obtained movement of the user relative to the electronic device, such that the electronic device can be configured to perform the corresponding control based on the user's state and true intention, thereby improving user experience.

An embodiment of the present disclosure provides an electronic device control device, which can be used to implement the control method described above. Consistent with the present disclosure, the use's state and true intention can be accurately determined based on the obtained movement of the user relative to the electronic device, such that the electronic device can be configured to perform the corresponding control based on the user's state and true intention, thereby improving user experience.

The electronic device control device provided by the embodiments of the present disclosure may include an acquisition circuit, a determination circuit, and a setting circuit. The acquisition circuit may be configured to obtain the position information of a specific object in the detection area, the determination circuit may be configured to determine the movement direction of the specific object based on the change of the position information, and the setting circuit may be configured to set the electronic device to a first operating state in response to the specific object moving out of the detection area from a first direction, or, set the electronic device to a second operating state in response to the specific object moving out of the detection area from a second direction. In some embodiments, the first operating state and the second operating state may be different when the first direction and the second direction are different.

In some embodiments, the acquisition circuit may include a first acquisition unit and/or a second acquisition unit. The first acquisition unit may be configured to obtain the image information of the specific object, and obtain the position information based on the image information. The second acquisition circuit may be configured to obtain the distance information from the specific object, and obtain the position information based on the distance information.

Further, the second acquisition circuit may also be configured to obtain the distance information between each area in the sensing surface of the detection device and the specific object. In some embodiments, the sensing surface may include a plurality of regions, and the plurality of region may be arranged in a matrix.

The setting circuit may include a first setting unit and/or a second setting unit. The first setting unit may be configured to determine that the specific object is in an away state when the specific object moves in a first direction and leaves the detection range of the detection area, and set the state of the electronic device to a sleep state or a hibernation state when the specific object is in the away state. The second setting unit may be configured to determine that the electronic device is not in the away state when the specific object moves in a second direction and leaves the detection range of the detection area, and set the electronic device to maintain the current state when the specific object is not in the away state.

In some embodiments, the first direction may be a direction toward either left or right side of the electronic device, or the second direction may be a direction toward the lower side of the electronic device.

In some embodiments, the first setting unit may be further configured to control the display device of the electronic device to be in an off state or a locked state when the state of the electronic device is the sleep state or the hibernation state.

In some embodiments, the second setting unit may be further configured to adjust the detection range of the detection area based on the position information when the electronic device maintains the current state.

In some embodiments, the first direction or the second direction may be determined based on the current attitude of the electronic device.

Consistent with the present disclosure, the use's state and true intention can be accurately determined based on the obtained movement of the user relative to the electronic device, such that the electronic device can be configured to perform the corresponding control based on the user's state and true intention, thereby improving user experience.

An embodiment of the present disclosure provides a storage medium. The storage medium is a computer-readable medium that stores a computer program, and when the computer program is executed by a processor, the method provided in foregoing embodiments of the present disclosure can be implemented. The method will be described in detail below.

S11, obtaining the position information of a specific object in the detection area.

S12, determining the movement direction of the specific object based on the change of the position information.

S13, setting the electronic device to a first operating state in response to the specific object moving out of the detection area from a first direction, or, setting the electronic device to a second operating state in response to the specific object moving out of the detection area from a second direction, where the first operating state and the second operating state are different when the first direction and the second direction are different.

Further, when the computer program is executed by the processor, any other methods described in the foregoing embodiment can be implemented.

Consistent with the present disclosure, the use's state and true intention can be accurately determined based on the obtained movement of the user relative to the electronic device, such that the electronic device can be configured to perform the corresponding control based on the user's state and true intention, thereby improving user experience.

Figure 9:
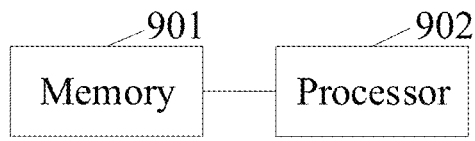
FIG. 9 is a schematic structural diagram of an electronic device according to an embodiment of the present disclosure.

An embodiment of the present disclosure provides an electronic device. FIG. 9 is a schematic structural diagram of an electronic device according to an embodiment of the present disclosure. As shown in FIG. 9, the electronic device includes a memory 901 and a processor 902. The memory 901 can be configured to store program instructions. The processor 902 can be configured to execute the program instructions stored in the memory. When executed by the processor 902, the program instructions can cause the processor 902 to implement the methods described in the foregoing embodiments. For example, when executed by the processor 902, the program instructions may cause the processor 902 to perform the following processes.

S21, obtain the position information of a specific object in the detection area.

S22, determine the movement direction of the specific object based on the change of the position information.

S23, set the electronic device to a first operating state in response to the specific object moving out of the detection area from a first direction, or, set the electronic device to a second operating state in response to the specific object moving out of the detection area from a second direction, where the first operating state and the second operating state are different when the first direction and the second direction are different.

Further, the processor 902 may be further configured to execute a computer program for executing any of the other methods described in the foregoing embodiments.

Consistent with the present disclosure, the use's state and true intention can be accurately determined based on the obtained movement of the user relative to the electronic device, such that the electronic device can be configured to perform the corresponding control based on the user's state and true intention, thereby improving user experience.

The storage medium described above may be included in the electronic device described above, or it may be stand-alone without being assembled into the electronic device.

The computer readable medium carries one or more programs, when the one or more programs are executed by the electronic device, causing the electronic device to: acquire at least two internet protocol addresses; and send the node evaluation request including at least two internet protocol addresses to the node evaluation device, wherein the node evaluation device selects and return an internet protocol address from the at least two internet protocol addresses; receive the internet protocol address returned by the node evaluation device; wherein the acquired internet protocol address indicates the edge nodes in the content distribution network.

Or, the computer readable medium carries one or more programs, when the one or more programs are executed by the electronic device, causing the electronic device to: receive a node evaluation request including at least two internet protocol addresses; select the internet protocol address from the at least two internet protocol addresses, and return the selected internet protocol address; wherein the received internet protocol address indicates an edge node in the content distribution network.

Computer program codes for executing the operations of the present disclosure may be written in one or more programming languages, or combinations thereof, wherein the programming languages comprises an object-oriented programming language such as Java, Smalltalk, C++, and also comprises conventional procedural programming language—such as "C" language or similar programming languages. The program codes may be executed entirely on the user's computer, partly executed on the user's computer, executed as an independent software package, partly executed on the user's computer and partly executed on the remote computer, or entirely executed on the remote computer or on the server. In the case of involving the remote computer, the remote computer may be connected to the user's computer through any kind of network, including a local area network (LAN) or a wide area network (WAN), or may be connected to an external computer (e.g., using an Internet service provider to connect via Internet).

It should be noted that the above computer readable medium of the present disclosure may be a computer readable signal medium or a computer readable storage medium or any combination of the above two. The computer readable storage medium may be, for example, but is not limited to, an electronic, magnetic, optical, electromagnetic, infrared, or semiconductor system, apparatus, or device, or any combination of the above. More specific examples of the computer readable storage media may include, but are not limited to, electrical connections having one or more wires, portable computer disks, hard disks, random access memory (RAM), read only memory (ROM), erasable programmable read only memory (EPROM or flash memory), optical fiber, portable compact disk read only memory (CD-ROM), optical storage device, magnetic storage device, or any suitable combination of the above. In the present disclosure, a computer readable storage medium may be any tangible medium that may contain or store programs, which may be used by or in connection with an instruction execution system, apparatus, or device. In the present disclosure, a computer readable signal medium may comprise a data signal that is propagated in the baseband or propagated as part of a carrier, carrying computer readable program codes. Such propagated data signals may take various forms, which includes, but is not limited to, electromagnetic signals, optical signals, or any suitable combination of the above. The computer readable signal medium may also be any computer readable medium except for a computer readable storage medium, and the computer readable signal medium may transmit, propagate or transport a program for use by or in connection with an instruction execution system, apparatus or device. Program codes contained on the computer readable medium may be transmitted by any suitable medium, which includes but is not limited to wire, fiber optic cable, RF (radio frequency), and the like, or any suitable combination of the above.

The flowchart and block diagrams in the drawings illustrate the architecture, function, and operation of possible implementations of systems, methods, and computer program products according to various embodiments of the present disclosure. In this regard, each block of the flowchart or block diagram may represent one module, a program segment, or a portion of the codes, and the module, the program segment, or the portion of codes comprises one or more executable instructions for implementing the specified logic functions. It should also be noted that in some alternative implementations, the functions noted in the blocks may also occur in an order different from the order noted in the drawings. For example, two successively represented blocks may in fact be executed substantially in parallel, and they may sometimes be executed in the opposite order, depending upon the involved function. It is also noted that each block of the block diagrams and/or flowcharts, and combinations of blocks in the block diagrams and/or flowcharts, may be implemented in a dedicated hardware-based system that executes the specified functions or operations, or it may be implemented by a combination of dedicated hardware and computer instructions.

The units or modules involved in the embodiments of the present disclosure may be implemented by way of software or hardware. The names of these units or modules are not considered as a limitation to the units or modules.

The functions described herein above may be performed, at least in part, by one or more hardware logic components. For example, and without limitation, exemplary types of hardware logic components that may be used include Field Programmable Gate Array (FPGA), Application Specific Integrated Circuit (ASIC), Application Specific Standard Product (ASSP), System on Chip (SOC), Complex Programmable Logic Device (CPLD), and the like.

In the context of the present disclosure, the machine-readable medium may be a tangible medium that may contain or store programs for use by or in connection with an instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination of the foregoing. More specific examples of the machine-readable storage medium may include an electrical connection based on one or more wires, portable computer disk, hard disk, random access memory (RAM), read only memory (ROM), erasable programmable read only memory (EPROM or flash memory), optical fiber, portable compact disk read only memory (CD-ROM), optical storage device, magnetic storage device, or any suitable combination of the foregoing.

The above description is only a preferred embodiment of the present disclosure and a description of the principles of the applied technology. It should be understood by those skilled in the art that the disclosure scope of the present disclosure is not limited to the specific technical solutions of the above technical features, and should also cover other technical solutions formed by the random combination of the above technical features or equivalent features thereof without departing from the above disclosed concept, such as a technique solution in which the above features are replaced with technical features having similar functions disclosed (but is not limited) in the present disclosure.

In addition, although various actions or steps are described in a specific order, this should not be understood that such actions or steps are required to be performed in the specific order shown or in sequential order, or all illustrated actions or steps should be performed to achieve the desired result. Multitasking and parallel processing may be advantageous in certain circumstances. Likewise, although several specific implementation details are included in the above discussion, these should not be construed as limiting the scope of the present disclosure. Certain features described in the context of separate embodiments may also be implemented in combination in a single implementation. Conversely, various features described in the context of a single implementation may also be implemented in a plurality of implementations, either individually or in any suitable subcombination.

Although the embodiments of the present disclosure are described in language specific to structural features and/or method logic actions, it should be understood that the subject matter defined in the appended claims is not limited to the specific features or actions described above. Instead, the specific features and actions described above are merely exemplary forms of implementing the claims.

It should be noted that the foregoing embodiments are merely intended for describing the technical solutions of the present disclosure instead of limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. An electronic device control method comprising:
   obtaining position information of a specific object in a detection area;
   determining a movement direction of the specific object based on the position information;
   determining whether the specific object is in an away state based on a direction of the specific object moving out of the detection area; and
   setting the electronic device to a first operating state in response to the specific object moving out of the detection area from a first direction, and/or, setting the electronic device to a second operating state in response to the specific object moving out of the detection area from a second direction, wherein
   when the first direction and the second direction are different, a power consumption of the electronic device at the first operating state is different from a power consumption of the electronic device at the second operating state.

2. The method of claim 1, wherein obtaining the position information of the specific object in the detection area includes:
   obtaining image information of the specific object; and
   obtaining the position information based on the image information; and/or
   obtaining distance information from the specific object; and
   obtaining the position information based on the distance information.

3. The method of claim 2, wherein obtaining the distance information from the specific object includes:
obtaining the distance information between each region of a sensing surface of a detection device and the specific object, the sensing surface including a plurality of regions.

4. The method of claim 3, wherein:
the plurality of regions are arranged in a matrix.

5. The method of claim 1, wherein setting the electronic device to the first operating state in response to the specific object moving out of the detection area from the first direction includes:
determining that the specific object is in the away state when the specific object moves in the first direction and leaves a detection range of the detection area; and
setting the electronic device to a sleep state or a hibernation state when the specific object is in the away state; and/or
setting the electronic device to the second operating state in response to the specific object moving out of the detection area from the second direction includes:
determining that the specific object is not in the away state when the specific object moves in the second direction and leaves the detection range of the detection area; and
setting the electronic device to maintain a current state when the specific object is not in the away state.

6. The method of claim 5, wherein:
the first direction is a direction toward either a left side or a right side of the electronic device; and/or, the second direction is a direction toward a lower side of the electronic device.

7. The method of claim 5 further comprising:
controlling a display device of the electronic device to be in an off state or a locked state when the electronic device is in the sleep state or the hibernation state.

8. The method of claim 5 further comprising:
adjusting the detection range of the detection area based on the position information when the electronic device maintains the current state.

9. The method of claim 5 further comprising:
determining the first direction and/or the second direction based on a current attitude of the electronic device.

10. The method of claim 1, wherein obtaining the position information includes:
obtaining, by a detection device arranged above a screen of the electronic device, position information of a user that is operating the electronic device with respect to the detection area of the detection device.

11. An electronic device control device comprising:
an acquisition circuit configured to obtain position information of a specific object in a detection area;
a determination circuit configured to determine a movement direction of the specific object based on the position information;
determining whether the specific object is in an away state based on a direction of the specific object moving out of the detection area; and
a setting circuit configured to set the electronic device to a first operating state in response to the specific object moving out of the detection area from a first direction, or, set the electronic device to a second operating state in response to the specific object moving out of the detection area from a second direction, wherein when the first direction and the second direction are different, a power consumption of the electronic device at the first operating state is different from a power consumption of the electronic device at the second operating state.

12. The device of claim 11, wherein obtaining the position information of the specific object in the detection area includes:
obtaining image information of the specific object; and
obtaining the position information based on the image information; and/or
obtaining distance information from the specific object; and
obtaining the position information based on the distance information.

13. The device of claim 12, wherein obtaining the distance information from the specific object includes:
obtaining the distance information between each region of a sensing surface of a detection device and the specific object, the sensing surface including a plurality of regions.

14. The device of claim 13, wherein:
the plurality of regions are arranged in a matrix.

15. The device of claim 11, wherein setting the electronic device to the first operating state in response to the specific object moving out of the detection area from the first direction includes:
determining that the specific object is in the away state when the specific object moves in the first direction and leaves a detection range of the detection area; and
setting the electronic device to a sleep state or a hibernation state when the specific object is in the away state; and/or
setting the electronic device to the second operating state in response to the specific object moving out of the detection area from the second direction includes:
determining that the specific object is not in the away state when the specific object moves in the second direction and leaves the detection range of the detection area; and
setting the electronic device to maintain a current state when the specific object is not in the away state.

16. The device of claim 15, wherein:
the first direction is a direction toward a left side or a right side of the electronic device;
and/or, the second direction is a direction toward a lower side of the electronic device.

17. An electronic device comprising:
a processor; and
a memory storing program instructions that, when being executed by the processor, cause the processor to
obtain position information of a specific object in a detection area;
determine a movement direction of the specific object based on the position information;
determining whether the specific object is in an away state based on a direction of the specific object moving out of the detection area; and
set the electronic device to a first operating state in response to the specific object moving out of the detection area from a first direction, or, set the electronic device to a second operating state in response to the specific object moving out of the detection area from a second direction, wherein when the first direction and the second direction are different, a power consumption of the electronic device at the first operating state is different from a power consumption of the electronic device at the second operating state.

18. The electronic device of claim 17, wherein the program instructions further cause the processor to:
   obtain image information of the specific object; and
   obtain the position information based on the image information; and/or
   obtain distance information from the specific object; and
   obtain the position information based on the distance information.

19. The electronic device of claim 18, wherein the program instructions further cause the processor to:
   obtain the distance information between each region of a sensing surface of a detection device and the specific object, the sensing surface including a plurality of regions.

20. The electronic device of claim 17, wherein the program instructions further cause the processor to:
   determine that the specific object is in an away state when the specific object moves in the first direction and leaves a detection range of the detection area; and
   set the electronic device to a sleep state or a hibernation state when the specific object is in the away state; and/or
   the program instructions further cause the processor to:
   determine that the specific object is not in the away state when the specific object moves in the second direction and leaves the detection range of the detection area; and
   set the electronic device to maintain a current state when the specific object is not in the away state.

\* \* \* \* \*